United States Patent [19]

Hass

[11] 4,092,404

[45] May 30, 1978

[54] CATALYTIC INCINERATION OF HYDROGEN SULFIDE FROM GAS STREAMS

[75] Inventor: Robert H. Hass, Fullerton, Calif.

[73] Assignee: Union Oil Company of California, Los Angeles, Calif.

[21] Appl. No.: 605,638

[22] Filed: Aug. 18, 1975

[51] Int. Cl.$^2$ .............................................. G01B 17/50
[52] U.S. Cl. .................................. 423/539; 423/230; 423/573 G
[58] Field of Search ............... 423/224, 230, 573, 574, 423/576, 539, 542, 543, 533; 252/455 Z; 60/641

[56] References Cited

U.S. PATENT DOCUMENTS

| | | | |
|---|---|---|---|
| 1,900,751 | 3/1933 | Baehr | 423/230 |
| 2,083,894 | 6/1937 | Connolly | 423/230 X |
| 2,083,895 | 6/1937 | Connolly | 423/230 X |
| 2,756,121 | 7/1956 | Grimes | 423/245 |
| 2,905,523 | 9/1959 | Houdry et al. | 423/245 X |
| 3,997,655 | 12/1976 | Reh et al. | 423/533 |

FOREIGN PATENT DOCUMENTS 733,004   7/1955   United Kingdom ................. 423/230

*Primary Examiner*—Earl C. Thomas
*Attorney, Agent, or Firm*—Gregory F. Wirzbicki; Lannas S. Henderson; Richard C. Hartman

[57] ABSTRACT

A process for the conversion of $H_2S$ to $SO_2$ is a feed gas containing $H_2S$ is effected by oxidation with air or oxygen at temperatures between 300° and 900° F. The oxidation is conducted in the presence of an extremely stable oxidation catalyst comprising an oxide and/or sulfide of vanadium supported on a non-alkaline porous refractory oxide. The preferred catalyst comprises between 5 and 15 wt.% $V_2O_5$ on hydrogen mordenite or alumina. Hydrogen, carbon monoxide and light hydrocarbons present in the feed gas are not oxidized. The invention is especially contemplated for use in treating waste gases from geothermal steam power plants.

17 Claims, 2 Drawing Figures

CATALYTIC INCINERATION OF HYDROGEN SULFIDE FROM GAS STREAMS

BACKGROUND AND SUMMARY OF THE INVENTION

Current air pollution regulations in most industrialized parts of the world are very restrictive concerning the amounts of $H_2S$ industry can discharge into the atmosphere. Los Angeles, for example, requires that no more than 10 ppmv be so discharged. The discharge requirements of $SO_2$, however, are not nearly so restrictive; Los Angeles waste gas streams containing up to 500 ppmv $SO_2$ can be safely discharged while Canada and Germany allow up to 2000 and 4000 ppmv, respectively. As a result, there is provided by law a strong incentive for industries engaged in such diverse activities as petroleum refining, meat packing, soap production, sewage treatment, electrical generation and chemical production to convert the $H_2S$ in their waste gas streams to $SO_2$ prior to atmospheric discharge. The manner by which this is presently accomplished is through the use of a stack gas incinerator, i.e., by blending sufficient natural gas or other fuel with the waste gas stream to provide a combustible mixture, and then burning the resultant mixture in the temperature range of 1350° – 1550° F at the point of discharge.

With the advent of the energy crisis another incentive has been provided to industry — namely, that of saving expensive fuel. Ideally, it would be most desirable to oxidize the $H_2S$ to $SO_2$ catalytically, without adding fuel. The development of a catalytic incinerator, however, has been hampered by the fact that waste gas streams containing $H_2S$ usually also contain in uncombustible amounts such highly oxidizable components as CO, $H_2$ and light hydrocarbons. These components, however, as well as $H_2S$, are readily oxidized by catalysis and in the process release large quantities of heat, thus requiring the catalytic incinerator to employ cooling means to avoid detrimental temperature increases. If the temperature should exceed 900° F, $H_2S$ may be produced (as will be explained hereinafter); if it exceeds about 1000° F there are the further dangers that $SO_3$ may be produced and that the catalyst might be thermally destroyed. Consequently, most catalytic incinerators need cooling facilities which may necessitate as much energy input, and more maintenance requirements, than burning in a stack gas incinerator.

From the preceding discussion, it is apparent that for a catalytic incinerator to be most effective it must be selective for the oxidation of $H_2S$ to $SO_2$. A major objective of the invention, therefore, is to provide a novel process for selectively incinerating $H_2S$ in the presenc of other normally oxidizable components. Another objective is to provide novel catalysts for effecting the selective incineration of $H_2S$ to $SO_2$. Another objective is to utilize the catalytic incineration process of the invention for treating vent gases emanating from geothermal power plants.

The present invention is a revised version of a known catalytic incineration process largely abandoned by the art. In United Kingdom patent 733,004, published Jan. 23, 1953, it is taught that a catalyst composed of 5-10 weight-percent $V_2O_5$ on alumina is effective in reducing $H_2S$ concentrations in Claus tail gas streams by converting the same to $SO_2$; however, no mention is made therein that said catalyst is selective for the incineration of $H_2S$ to $SO_2$ in the presence of $H_2$, CO or light hydrocarbons.

By the process of the present invention it has been found that catalysts composed of 5-15 weight-percent $V_2O_5$ on alumina, hydrogen mordenite or any other non-alkaline porous refractory oxide are very selective for the oxidation of $H_2S$ to $SO_2$ in the presence of $H_2$, CO or light hydrocarbons. Even more surprisingly, it has been found that these normally oxidizable components of $H_2$, CO and light hydrocarbons remain unoxidized even when excess air is utilized to perform the $H_2S$ to $SO_2$ conversion. Furthermore, conversions of $H_2S$ to $SO_2$ are essentially 90 to 100 percent complete and space velocities varying in the wide range of 1,000 to 100,000 GHSV can be utilized. Operating temperatures can vary from a minimum of 300° to a maximum of about 900° F.

BRIEF DESCRIPTION OF THE DRAWINGS

The accompanying drawing designated

DETAILED DESCRIPTION OF THE INVENTION

This invention is particularly concerned with the selective oxidation of $H_2S$ to $SO_2$ in a feed gas comprising $H_2S$ and any of the relatively inert inorganic gases such as nitrogen, carbon dioxide, water vapor, argon, helium, neon, etc., and/or any of the normally oxidizable components such as $H_2$, CO and light hydrocarbons. As used herein, the term "light hydrocarbons" refers to those saturated hydrocarbons containing no more than six carbon atoms. Many other gases may be present in the feed gas but as those skilled in the art will readily understand, the remaining gaseous components (except for sulfur vapor as will be shown hereinafter) should be chemically inert under the conversion conditions specified herein, and should not adversely affect or poison the catalyst. The process is particularly contemplated for the catalytic oxidation of $H_2S$ present in waste gas streams which discharge from petroleum refineries, sewage plants, meat packing plants, geothermal power plants, soap factories and chemical manufacturing plants. Additionally, the process is useful in situations wherein it is desired to reduce the $H_2S$ content of sour natural gases, sour refinery gases, etc.

The process is most advantageously utilized for treating "sour" gases containing at least about 50, usually at least about 100 ppmv of $H_2S$, and at least about 100, usually at least about 500 ppmv, of at least one oxidizable component selected from the class consisting of hydrogen, carbon monoxide and light hydrocarbons. Other components found in the feed gases usually consist of one or more of: $CO_2$, $N_2$, $H_2O$, $O_2$, $SO_2$, COS and $NH_3$.

Figure 1:
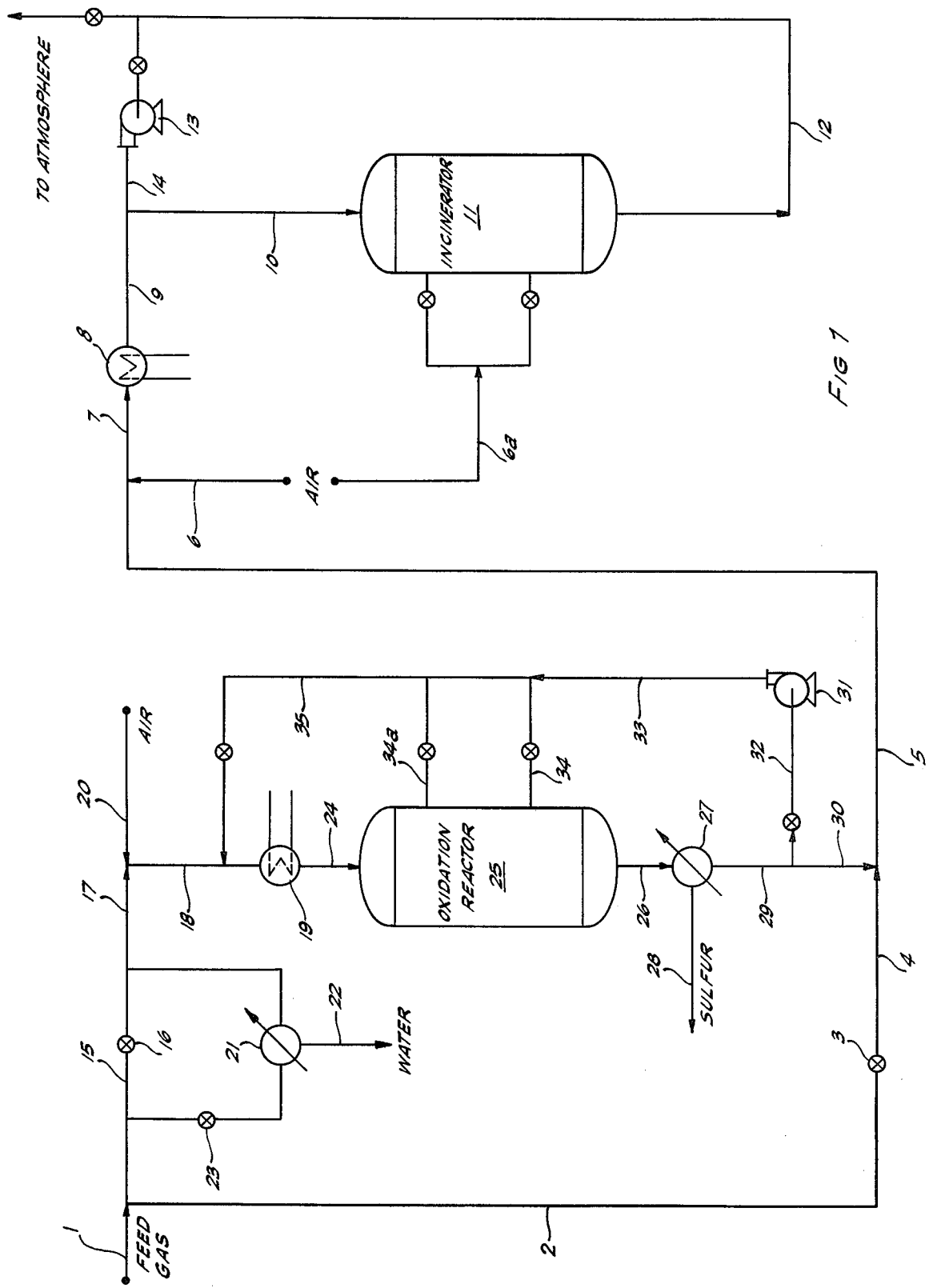
FIG. 1 is a simplified flow diagram illustrating a preferred effluent-gas-recycle embodiment of the invention.

The basic process can be more readily understood by reference to the accompanying FIG. 1. A feed gas directed through lines 1, 2, 4 and 5 is blended with an excess of an oxygen-containing gas, preferably air, from line 6, and the resultant mixture is fed via conduit 7 to a suitable preheater 8 to heat the gases to at least about 300° F, preferably to some temperature between about 300° and 900° F. The heated mixture is then fed through lines 9 and 10 to the catalytic incinerator 11 a a space velocity between 1,000 and 100,000 v/v/hour, preferably between about 2,000 and 20,000 v/v/hour. The gases contact a catalyst in the incinerator 11 which catalyst comprises one or more vanadium oxides and/or sulfides, supported on a non-alkaline, porous refractory oxide. This catalyst, described in fuller detail hereinafter, is highly active for the conversion of $H_2S$ to $SO_2$, and, depending upon the space velocity and $H_2S$ concentration in the feed gas-oxidant mixture, can effect $H_2S$ conversions at least about 80%, usually between about 90 and 100%, complete. Furthermore, the catalyst is so selective for the oxidation of $H_2S$ that such highly oxidizable components as $H_2$, CO and light hydrocarbons, any or all of which might be present, remain almost completely unoxidized, thus greatly reducing the overall amount of heat generated.

The reaction in the catalytic incinerator is highly exothermic:

$$2H_2S + 3O_2 \rightarrow 2SO_2 + 2H_2O \qquad (I)$$

($\Delta H_{400° F} = -220,275$ Btu/lb-mole $H_2S$ oxidized)
and the temperature in said incinerator will rise depending on the quantity of $H_2S$ present in, and the heat capacity of, the entering feed gas-oxidant mixture. For feed gas streams containing only small quantities of $H_2S$ the temperature rise will be relatively insignificant, thus permitting simple adiabatic operation, with the exit gas temperature being held at between about 350° and about 900° F without means for cooling. For feed gas streams containing larger quantities of $H_2S$, however, the generation of heat via Reaction (I) can become a problem. In one embodiment, therefore, the gases in the reactor are cooled externally by indirect heat exchange so that the conversion of $H_2S$ to $SO_2$ takes place more or less isothermally; in this embodiment, the feed gas-oxidant mixture can be preheated to any desired isothermally-held incinerator temperature between about 300° and 900° F, preferably between about 500° and 850° F.

In commercial practice, however, it is a substantial impossibility to maintain true isothermal conditions. Hence, if the temperature, $H_2S$ content and heat capacity of the influent gases are such that adiabatic operation would result in temperatures exceeding about 900° F, one or more internal temperature control measures may be adopted. In a preferred embodiment, the influent gases are diluted with sufficient additional oxidant gas that, when the total mixture is preheated to between about 300° and about 750° F, an exit gas temperature between about 500° and about 900° F, preferably between about 600° and 850° F, is maintained. This dilution can be accomplished simply by adding more oxidant gas via line 6. Alternatively, a combined dilution-quenching technique may be utilized by admitting cool air at one or more downstream points in the incinerator via supply line 6a. If desired, a portion of the purified gs to be discharged to the atmosphere via line 12 can be recycled to line 10 via blower 13 and line 14 to provide all or a portion of the desired dilution. This latter alternative has the additional advantages of at least partially heating the fresh influent gases, thus reducing the load on preheater 8, and of allowing for further conversion of any $H_2S$ remaining in the recycled gases.

It is highly preferably in carrying out the oxidation that at least stoichiometric oxygen for Reaction (I) be used. If less than the stoichiometric amount is utilized, then the formation of sulfur by the Claus reaction:

$$2H_2S + SO_2 \rightleftharpoons 3S + 2H_2O \qquad (II)$$

becomes a distinct possibility because incineration of $H_2S$ to $SO_2$ is incomplete. The discharge of gaseous elemental sulfur may then violate other air pollution laws. Also, if the sulfur vapor were to exceed its dew point, it would condense on the catalyst and incinerator surfaces. This would then result in deactivation of the catalyst and, possibly, plugging of the incinerator. Lastly, some $H_2S$ would remain unreacted and the purpose of the incinerator might be defeated. Thus, although the use of less than stoichiometric oxygen may be found feasible or utilitarian in some instances, it is recommended that oxygen, preferably in the form of air, should be used in any excess amount above that required for Reaction (I). Preferably between about 1.1 and 5.0 times the stoichiometric amount is so used.

One very desirable feature of the invention is that Reaction (I) has an extremely favorable equilibrium constant (i.e., $K_p 400° F = 4.98 \times 10^{52}$) for the production of $SO_2$. As a result, the process is most useful for treating feed gases containing substantial amounts of water vapor.

There are several situations in which it is foreseen that control of the effluent gas $SO_2$ concentration and/or temperature is, if not necessary, at least desirable. For example, if the $H_2S$ concentration of the feed gas-oxidant mixture is excessive, the product $SO_2$ concentration may itself violate air pollution laws. Also, in the absence of means for external cooling, the processing of gases containing high concentrations of $H_2S$ would, because of the exothermic nature of Reaction (I), result in effluent gas temperatures in excess of the maximum operating temperature, 900° F. This in turn may effect the conversion of some $SO_2$ to $SO_3$ which, in addition to being a more noxious air pollutant than either $H_2S$ or $SO_2$, might also attack the catalyst support. Also, if hydrogen is present, operating at about 900° F may bring about a combination of hydrogen with oxygen to form water and/or a combination of hydrogen with $SO_2$ to form the original starting material, $H_2S$:

$$SO_2 + 3H_2 \rightarrow H_2S + 2H_2O \qquad (III)$$

Fortunately, none of these problems arises when the process is operated to control both the temperature and the $SO_2$ concentration in the effluent gas.

In a preferred embodiment of the invention, simultaneous control of temperature and $SO_2$ concentration in the exit gas is effected by diluting the feed gas with air via line 6, recycle gases via line 14, externally derived gases (not referenced in FIG. 1), or any combination thereof, so that the resultant mixture entering the incinerator via line 10 contains some predetermined maximum $H_2S$ concentration. (Alternatively, all or a portion of the oxygen can be added via line 6a instead of line 6 to achieve the same ultimate objectives of control of exit gas temperature and $SO_2$ concentration.) Since the catalyst is selective for the oxidation of $H_2S$, any adiabatic temperature rise in the incinerator is due almost exclusively to the exothermic nature of Reaction (I). Thus, assuming the heat capacity of the gases within the incinerator remains relatively constant during the oxidation of the $H_2S$, the temperature rise therein is directly proportional to the concentration of $H_2S$ in the feed gas-oxidant mixture:

$$T_{exit} - T_{inlet} = CM$$

(where M is the $H_2S$ concentration in mole % and C is the proportionating constant, hereinafter termed the temperature rise coefficient, in °F/mole%). Therefore, in the preferred embodiment, the feed gas-oxidant mixture is heated to some temperature between about 300° and 750° F such that a predetermined maximum concentration of $H_2S$ in said mixture will produce a predetermined maximum exit gas temperature in the range of about 500° – 900° F. When operated in this manner, the process normally results in incineration of at least about 95%, and usually between about 98 and 100%, of the available $H_2S$ to $SO_2$. The following hypothetical Example is illustrative of the points discussed above. (All Examples herein are illustrative only and are not intended to be limiting.)

EXAMPLE I

A Canadian industry must discharge a hydrogenated Claus tail gas (hydrogenated to convert all sulfur compounds to $H_2S$ as described, e.g., in Canadian Pat. No. 918384). The gas contains 3 mole % $H_2S$ and a substantial amount of hydrogen. To avoid the production of $SO_3$, or $H_2S$ (by Reaction (III)), it is specified that the exit gas temperature of the incinerator be no more than 750° F. It is also necessary to maintain the exit gas $SO_2$ concentration at 2000 ppmv, the maximum permissible discharge limit. Thus, air must be added to the feed gas stream such that the ratio of feed gas to air in the resultant mixture is 1:14. Assuming the temperature rise coefficient of this mixture is 205° F/mole % $H_2S$ oxidized to $SO_2$, and assuming 100% conversion of $H_2S$ to $SO_2$, the preheater need only heat the mixture to 709° F (750 − T = 205 × 0.2; T = 709). The preheated mixture of feed gas and air enters the incinerator and contacts a catalyst comprising 10 weight % $V_2O_5$ on hydrogen mordenite, which catalyst is effective for the exothermic oxidation of $H_2S$ to $SO_2$. Once the exit gas achieves a temperature of 750° F, a portion of it may be recycled back to be blended with the feed gas, and the air feed suitably reduced, so that the $H_2S$ concentration of the gases entering the incinerator is still maintained at 0.2 mole %. However, for best results, the reduction in air feed must not be so extensive that only stoichiometric or less oxygen (for Reaction (I)) is blended into the feed gas stream.

In many cases, especially in the case of feed gases containing more than about 400 ppmv of $H_2S$, it may be desirable prior to incineration to oxidize a portion of the $H_2S$ to elemental sulfur. In FIG. 1 this is accomplished by adjusting valves 3 and 16 so that all or a portion of the feed gas is directed through line 15, valve 16 and lines 17 and 18 to preheater 19. Prior to entering said preheater, however, an oxygen containing gas, preferably air, is blended with the feed gas via line 20. The amount of air so introduced is any amount less than the stoichiometric amount necessary for the oxidation of $H_2S$ in the feed gas to $SO_2$ via Reaction (I); however, in the preferred operation, air is supplied via line 20 in substantially the exact stoichiometric amount necessary for the oxidation of said $H_2S$ to sulfur via:

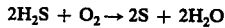

$$2H_2S + O_2 \rightarrow 2S + 2H_2O \qquad (IV)$$

Since Reaction (IV) is known to proceed, at least in part, by Reaction (I) followed by Reaction (II), and since the latter is equilibrium-limited by water vapor, sulfur production is enhanced if the feed gas is substantially dehydrated. Hence, an optional condenser 21, or other dehydrating means, is provided to remove water via line 22. The amount of water so removed depends upon the operating characteristics of the condenser 21 and the amount of feed gas processed through valve 23 versus the amount allowed to pass through valve 16. Preferably, however, all of the feed gas is fed via valve 23 to condenser 21 to remove sufficient water so that the feed gas entering line 17 contains less than about 15%, preferably less than about 10% by volume, of water vapor.

The mixture of feed gas and air is fed to preheater 19 wherein it is heated to a temperature of at least about 250° F but no more than about 325° F, and then fed via line 24 to oxidation reactor 25 at a space velocity between about 250 and 2000 v/v/hour, but preferably between about 800 and 1000 v/v/hour. The gases contact a catalyst in the oxidation reactor 25 at a temperature in the range of about 250° – 450° F, but preferably in the range of about 300° – 400° F. The preferred catalyst is one which comprises reduced vanadium pentoxide ($V_2O_5$), between about 5 and 15% by weight, on alumina; however, after being reduced with hydrogen or other reducing gas such as CO, any of the catalysts hereinafter described in more detail for use in catalytic incinerator 11 can be used in oxidation reactor 25. In their oxidized state the catalysts appear to be less active for producing sulfur via Reaction (IV), but, when utilized in oxidation reactor 25 under the preferred conditions hereinbefore specified, these catalysts are capable of effecting an air oxidation of $H_2S$ to sulfur of at least 50%, and preferably at least 90%, complete, and of effecting the same without also oxidizing significant amounts of $H_2$, CO and light hydrocarbons, any or all of which may be present in the feed gas. In addition, they also retain these desired properties of high activity and selectivity for extended periods of time; their estimated life when processing suitable feed gases under the conditions hereinbefore specified is considered to be at least about one year.

The gases leaving the oxidation reactor 25 are passed via line 26 to sulfur condenser 27 which lowers the temperature of said gases to preferably between about 250° and 270° F. As the sulfur condenses, it is removed via line 28. The remaining noncondensable off-gases are then sent via lines 29 and 30 to be blended in line 5 with that portion of the feed gas, if any, which by-passes reactor 25 via line 4. This mixture of gases is then incinerated as previously described.

If desired, a portion of the gases leaving the sulfur condenser 27 via line 29 can be recycled by blower 31 through line 32, manifold line 33, and lines 34 and/or 34a directly into the oxidation reactor 25. These recycle gases can also be conducted through line 35 into line 18 to admix with the gases entering the preheater 19. The purpose in recycling these gases is primarily to prevent sulfur deposition on the catalyst by so diuting the $H_2S$ in the gases entering, or already in the oxidation reactor 25, that, even if it were all oxidized to sulfur, the sulfur dew point of said gases would still be maintained below the operating Reaction of oxidation reactor 25. Secondarily, Reactio (IV) being highly exothermic, these recycle gases can maintain the oxidation temperature rise in oxidation reactor 25 within the narrow 250° – 450° F range recited hereinbefore by: (1) injecting (250° – 270° F) quench gases directly into oxidation reactor 25 via lines 34 and/or 34a, and/or (2) by diluting via line 35 the H$_2$S concentration in the feed gases prior to entering the preheater 19 in a manner and for results similar to those hereinbefore set forth in Example I. With respect to this second temperature control method, the only demonstrable difference between it and that described for incinerator 11 is that for any mixture of gases entering oxidation reactor 25, the temperature rise coefficient is dependent upon the heat of reaction of Reaction (IV), rather than that of Reaction (I).

In practicing the sulfur recovery-incineration process shown in FIG. 1, it should be noted that some sulfur vapor may well be present in the feed gas entering the incinerator 11. Because the catalyst employed therein oxidizes sulfur vapor (as well as H$_2$S) to SO$_2$, it is necessary in the preferred method of operation to blend at least sufficient oxygen via line 6 or 6a for the oxidation of both the sulfur vapor and H$_2$S. Normally, however, the sulfur vapor concentration in such gases is relatively small, or even insignificant, and thus will play essentially no role in commercial operation of the process.

Both the incineration and oxidation operations described above are preferably carried out at about atmospheric pressure, but pressures ranging between about 5 – 500 psia are contemplated.

The most critical aspect of the invention resides in the nature of the catalyst utilized in the incinerator. In general, catalyst comprising one or more vanadium oxides and/or sulfides supported on a nonalkaline porous refractory oxide are operative. Suitable nonalkaline supports, as defined herein, include such refractory oxides as silica, alumina, silica-alumina, silica-magnesia, zirconia, silica-zirconia, titania, silica-titania, silica-zirconia-titania, or combinations of the aforementioned materials. Acidic metal phosphates and arsenates such as aluminum phosphate, boron phosphate, chromium phosphate, rare earth phosphates, aluminum arsenate, etc., may also be used, as also may certain amorphous and crystalline aluminosilicate zeolites, including such naturally occurring zeolites as mordenite, erionite, stilbite, faujasite and the like (in their "non-alkaline" forms — as hereinafter defined). Synthetic hydrogen "Y" zeolites having a silica-to-alumina (SiO$_2$/Al$_2$O$_3$) ratio between about 4:1 and 6:1, and synthetic forms of the natural zeolites noted above can also be used with success. Preferred crystalline aluminosilicate zeolites, whether natural or synthetic, consist of silica and alumina in ratio between about 4:1 to 100:1. Especially preferred, however, are those natural and synthetic crystalline aluminosilicate zeolites having a silica-to-alumina ratio between about 6:1 to 100:1, mordenite and erionite, particularly in the hydrogen or decationized forms, being found to be most suitable.

The "non-alkaline supports" employed herein may be characterized as materials which contain no more than about 4 weight percent, preferably less than about 2 weight percent, of alkali metal or alkaline earth metal compounds, calculated as oxides, which compounds are sufficiently basic to form salts with anionic oxides of the active metal component, e.g., vanadates. Such salt formation is believed to be at least one alkali-induced transformation leading to rapid deactivation of the catalyst. Sodium zeolites are exemplary of such undesirable basic compounds.

Alumina is a preferred support, particularly in the presence of large quantities of water vapor. However, it has also been discovered, as will be shown hereinafter in Examples IV and X, that in the presence of excessive amounts of SO$_2$ and O$_2$, alumina based catalysts appear to be susceptible to sulfation, and consequent gradual deactivation. Evidently, SO$_2$ and O$_2$ react on the catalyst surface to sulfate the catalyst, either directly or indirectly via the intermediate formation of SO$_3$. (This discovery probably best explains the lack of commercialization of the process described in U.K. Pat. No. 733,004 which teaches the use of catalysts comprising V$_2$O$_5$ on alumina for H$_2$S incineration of Claus tail gases.) Hence, although alumina based catalysts are operable in the wide range of conditions specified hereinbefore, their lives are probably somewhat limited when they are used to process feed gas-oxidant mixtures containing more than about 1 to 1.5 mole % H$_2$S. It is therefore recommended that when alumina based catalysts — or other sulfatable supported catalysts comprising silica-magnesia, zirconia, silica-zirconia, titania, silica-titania, silica-zirconia-titania, etc., — are to be used for processing feed gas-oxidant mixtures containing more than about 1 mole % H$_2$S, conditions be chosen for operation which reduce the likelihood of catalyst sulfation. Among these include lower operating temperatures, the use of externally derived diluent gases and the use of oxygen or air in amounts at or just slightly above the stoichiometric (for Reaction (I)) amount required to convert all of the H$_2$S to SO$_2$.

The remaining catalyst supports hereinbefore mentioned have been found to be stable in the presence of SO$_3$ and SO$_2$ plus O$_2$ and their use in environments containing such reactants is normally preferred, depending upon other environmental factors. Silica, for example, does not sulfate but because of its wellknown susceptibility to decomposition and volatilization in the presence of water vapor, it should not be used in environments wherein the water dew point can exceed about 120° F. Likewise, amorphous aluminosilicates (unless steam stabilized so as to maintain a surface area above about 200 m$^2$/gm in the presence of steam) should not be used if the water dew point can exceed about 150° F. On the other hand, crystalline aluminosilicates having a silica-to-alumina mole-ratio between about 4:1 and 100:1, and particularly those having a silica-to-alumina ratio between about 6:1 and 40:1, are largely immune to attack by water vapor, SO$_3$ or SO$_2$ plus O$_2$. Thus, hydrogen "Y" zeolite, hydrogen mordenite and hydrogen erionite are excellent examples of catalyst supports which will render long and useful service over a wide range of operating conditions. Hydrogen mordenite is especially preferred because of its substantial immunity to SO$_3$ attack. Even when prepared in the wide silica-to-alumina ratios from about 10:1 to about 100:1, hydrogen mordenite is extremely SO$_3$-resistant. In ratios higher than about 40:1, however, the hydrogen mordenite tends to become unstable hydrothermally; consequently, the preferred catalyst support in the presence of SO$_3$ (or SO$_2$ plus O$_2$) and/or water vapor is one composed of hydrogen mordenite with a silica-to-alumina ratio between about 10:1 and about 40:1.

The foregoing supports are compounded as by impregnation, with from about 0.2 to 30 weight percent, preferably 2 to 20 weight percent, of a vanadium promoter. Specifically, any oxide and/or sulfide of vanadium will perform satisfactorily. The preferred active metal component, however, is vanadium pentoxide (V$_2$O$_5$) in proportions between about 1 and 30% by weight. Especially preferred, however, is a catalyst comprising between 2 and 20 weight percent $V_2O_5$, more preferably between about 5 and 15 weight percent $V_2O_5$.

After being pelleted or extruded, the catalyst is subsequently dried and calcined at 800° – 1200° F for about 1 – 12 hours. If reduction is necessary (i.e., because the catalyst is to be utilized in oxidation reactor 25), it can be accomplished by passing a mixture of gases consisting of 10 mole % $H_2S$ and 90 mole % $H_2$ at a temperature of about 400° F and at a space velocity between about 400 and 600 v/v/hour over the catalyst for about 2 hours. If a reduced catalyst is used in incinerator 11, it can effect the intended air oxidation of $H_2S$ to $SO_2$; however, the operating conditions in said incinerator 11 are such that the active metal promoter will eventually become oxidized and/or sulfided.

One catalyst of the invention is prepared as follows: 10% $V_2O_5$ on alumina: 200 gm of $Al_2O_3$ (as hydrated spray-dried alumina) was soaked in a hot solution of 28.5 gm of $NH_4VO_3$ in 500 ml water. The paste so formed was dried at 90° – 100° F, remoistened and extruded through a ⅛ inch die, dried at 212° F and calcined at 932° F for 3 hours. Under favorable circumstances this catalyst is known to be able successfully to incinerate $H_2S$ with no measurable loss of activity after 30 days operation. Its useful life is considered to be about a year. An incineration of $H_2S$ to $SO_2$ between about 90 and 100% complete can be expected from this catalyst when utilized under the conditions shown in the following four Examples. (It should be noted that all feed and product composition shown in these four Examples are reported on a dry mole-percent basis and that the water dew point of each of the feed gases, unless otherwise specified, was 55° F).

EXAMPLES II and III

A waste gas having the dry composition shown in Table I was blended with excess air such that 1.5 times the stoichiometric amount of oxygen necessary for Reaction (I) was available as a reactant, and the resultant mixture was passed at a pressure slightly above atmospheric and at a space velocity of 1752 GHSV over a catalyst comprising 10% $V_2O_5$ on $Al_2O_3$, prepared substantially as above described. The incinerator temperature was maintained isothermally at 400° F. No recycle or other diluent gases were used. A product gas of the indicated dry composition was obtained. Another waste gas having the dry composition shown in Table II was treated similarly except that an isothermallyheld incinerator temperature of 350° F was used. A product gas having the dry composition shown in Table II was obtained. As shown in both Examples, essentially complete conversion of the $H_2S$ to $SO_2$ was effected and essentially no oxidation of $H_2$, CO or $CH_4$ occurred.

TABLE I

| Gas Component | Mole % in Feed | Mole % in Product |
| --- | --- | --- |
| Hydrogen | 5.3372 | 5.3371 |
| Carbon Monoxide | 0.7407 | 0.8086 |
| Methane | 0.0357 | 0.0352 |
| Nitrogen | 87.6917 | 87.6628 |
| Oxygen | 0.0126 | 0.0374 |
| Hydrogen Sulfide | 0.0196 | 0.0006 |
| Argon | 0.0389 | 0.0430 |
| Carbon Dioxide | 6.0594 | 6.0332 |
| Methyl Mercaptan | 0.0003 | 0.0004 |
| Carbonyl Sulfide | 0.0055 | 0.0066 |
| Sulfur Dioxide | 0.0186 | 0.0352 |
| Carbon Disulfide | 0.0 | 0.0001 |
| Total Sulfur Compounds[1] | 0.0440 | 0.0430 |
| Overall $H_2S$ Conversion = 96.94% | | |

[1]Expressed as moles of $SO_2$ or monatomic sulfur compounds.

TABLE II

| Gas Component | Mole % In Feed | Mole % In product |
| --- | --- | --- |
| Hydrogen | 5.4118 | 5.4964 |
| Carbon Monoxide | 0.8629 | 0.8661 |
| Methane | 0.0360 | 0.0362 |
| Nitrogen | 87.3931 | 87.3036 |
| Oxygen | 0.0103 | 0.0583 |
| Hydrogen Sulfide | 0.0066 | 0.0000 |
| Argon | 0.0416 | 0.0439 |
| Carbon Dioxide | 6.2357 | 6.1853 |
| Methyl Mercaptan | 0.0003 | 0.0004 |
| Carbonyl Sulfide | 0.0001 | 0.0011 |
| Sulfur Dioxide | 0.0018 | 0.0088 |
| Carbon Disulfide | 0.0001 | 0.0000 |
| Total Sulfur Compounds[1] | 0.0090 | 0.0103 |
| Overall $H_2S$ Conversion = 100% | | |

[1]Expressed as moles of $SO_2$ or monatomic sulfur compounds.

EXAMPLE IV

In seven different experimental runs, a feed gas-air mixture (water vapor dew point = 68° F) having the average dry composition shown in Table III was passed over the 10% $V_2O_5$ on $Al_2O_3$ catalyst hereinbefore described. Each run was conducted at a different isothermally held temperature but in all other respects the runs were identical. No recycle or other diluent gases were used. Other pertinent data concerning the runs were as follows: Pressure = 3–15 in. $H_2O$ (above atmospheric); GHSV = 4189; Excess Air Available = 1.5 times stoichiometric (for Reaction (I)). The results were as follows:

TABLE III

| Run No. a Temperature, °F | | 1 402 | 2 503 | 3 604 | 4 700 | 5 803 | 6 854 | 7 902 |
| --- | --- | --- | --- | --- | --- | --- | --- | --- |
| Component | Feed | | | | | | | |
| $H_2$ mol % | 16.67 | 16.73 | 17.10 | 16.90 | 16.32 | 16.07 | 16.13 | 13.44 |
| $CH_4$ mol % | 12.13 | 12.22 | 12.23 | 12.36 | 12.47 | 12.41 | 12.49 | 13.04 |
| $N_2$ mol % | 11.71 | 11.63 | 11.80 | 11.95 | 11.32 | 11.46 | 12.14 | 12.39 |
| $O_2$ mol % | 2.82 | 2.21 | 0.86 | 0.75 | 0.48 | 0.44 | 0.23 | 0.00 |
| Ar mol % | 0.13 | 0.14 | 0.13 | 0.14 | 0.14 | 0.14 | 0.14 | 0.15 |
| $CO_2$ mol % | 55.28 | 56.17 | 55.83 | 55.79 | 56.87 | 57.01 | 56.69 | 59.33 |
| $H_2S$ ppmv | 12234 | 4579 | 227 | 23 | 50 | 33 | 22 | 6328 |
| $CH_3SH$ ppmv | 13.6 | 15 | 0 | 0 | 0 | 13 | 0 | 15 |
| COS ppmv | 18.3 | 9 | 9 | 12 | 24 | 29 | 21 | 683 |
| $SO_2$ ppmv[2] | 152 | 3441 | 12518 | 13092 | 12926 | 13244 | 13455 | 5819 |
| $CS_2$ ppmv | 5.6 | 4 | 8 | 5 | 3 | 7 | 5 | 8 |
| Total S Compounds, ppmv[1,2] | 12430 | 8051 | 12771 | 13137 | 13001 | 13333 | 13408 | 12861 |
| % $H_2S$ Conversion | | 62.6 | 98.14 | 99.812 | 99.591 | 99.730 | 99.820 | 48.3 |

[1]Expressed as ppmv $SO_2$ or ppmv monatomic sulfur compounds.
[2]The slight increase of total sulfur compounds is due to analytical errors in determining $SO_2$; $SO_2$ values should be somewhat lower.

It is seen from the foregoing that a conversion of $H_2S$ to $SO_2$ at least 98% complete is effected whenever the exit gas temperature of the incinerator is maintained between about 500° and 850° F. Also, a conversion between 99 and 100% complete is consistently obtained when the exit gas temperature is maintained between 600° and 850° F. The high content of $H_2S$ in the product gas from Run 7 apparently means either that, when the oxygen become depleted, hydrogen begins to combine with $SO_2$ to reform $H_2S$ (Reaction III), or that at about 900° F hydrogen begins to react with $O_2$ to form water, thus depleting the $O_2$ available for oxidizing $H_2S$. In any event it is apparent that temperatures in excess of 900° F, at least with the instant catalyst, result in some oxidation of $H_2$ to water and some reaction of $CO_2$ with $H_2S$ to form COS. Lastly, it is concluded that essentially no $SO_3$ forms at temperatures below about 900° F because any available hydrogen would reduce the $SO_3$ to $SO_2$ and water; since no loss in hydrogen is found below 900° F in Table III, no demonstrable evidence of $SO_3$ production is found. This result is considered surprising inasmuch as vanadia catalysts used in the sulfuric acid industry are known to be very active for oxidizing $SO_2$ to $SO_3$ even at temperatures as low as 750° F.

EXAMPLE V

In a run to demonstrate the effectiveness of the combined sulfur recovery-incineration process shown in FIG. 1 and described in more detail hereinbefore, a waste gas was utilized having the following dry feed composition in mole %:

| | | | |
|---|---|---|---|
| $H_2$ | 5.5380 | Ar | 0.0412 |
| CO | 0.7965 | $CO_2$ | 6.2010 |
| $CH_4$ | 0.0367 | $CH_3SH$ | 0.0004 |
| $N_2$ | 87.3190 | COS | 0.0011 |
| $O_2$ | 0.0093 | $SO_2$ | 0.0164 |
| $H_2S$ | 0.0403 | $CS_2$ | 0.0 |
| Total Sulfur Compounds[1] | | | 0.0582 |

[1]Expressed as moles of $SO_2$ or monatomic sulfur compounds

This feed gas was blended with air such that a stoichiometric amount of oxygen (for Reaction (IV)) was available as a reactant. The resultant mixture was fed at 325° F and 876 GHSV to an oxidation reactor containing a catalyst of the same composition as those used in Examples II through IV herein except that it was reduced with a reducing gas mixture of 90% $H_2$ – 10% $H_2S$ passed over said catalyst at a temperature of about 400° F and at a space velocity of 500 v/v/hour for about 2 hours. The gases within the oxidation reactor were maintained at about 325° F by external cooling means. The gases leaving the oxidation reactor were passed through a sulfur condenser which cooled the gases to 260° F and removed sulfur. No recycle gases were used for temperature control or for dilution of sulfur vapors. The off gas from the sulfur condenser had the dry composition shown in the first column of Table II and was further treated as described in Example III. The results obtained were those shown in the second column of Table II.

Each of the following three Examples describes a preferred catalyst useful in the incineration and oxidation steps.

EXAMPLE VI 600 gm Zeolon, a commercial synthetic sodium mordenite manufactured by the Norton Company, was slurried in 5000 ml 1.0 N HCl at room temperature for 60 minutes. It was then filtered and the treatment was repeated on the filter cake. The filter cake from the second treatment was slurried in hot 1.0 N HCl (73° C) for 1 hour, then filtered, and finally washed on the filter with four 1000 ml washes of hot water. After the filter cake was dried, the $Na_2O$ content was 0.57% by weight (about 93% exchanged to the hydrogen form). The hot treatment was repeated twice more for 45 minutes each, after which time the $Na_2O$ level was 0.21% by weight (97.5% exchanged). The amount of aluminum extracted was relatively small, so the product had a $SiO_2/Al_2O_3$ ratio of 11.5 compared to the original ratio of 10.

An amount of the dried hydrogen mordenite, corresponding to 225 gm of anhydrous powder, was mulled together with 424 gm of a silica hydrogel (containing about 6% $SiO_2$ or 25 gm of anhydrous silica) and 36.1 gm of $NH_4VO_3$ (or 27.8 gm of $V_2O_5$). The mixture was dried during mulling with a flow of hot air until it was of extrudable consistency. It was then extruded through a ⅛-inch die, dried, and calcined at 932° F for 3 hours. The product containing 10% by weight of $V_2O_5$ had excellent physical properties and had a deep golden color.

EXAMPLE VII

A silica hydrogel was prepared in a manner similar to that used for the preparation of the hydrogel binder of Example VI. Two solutions (A) and (B) were prepared as follows:

(A) 70 ml of concentrated (96%) $H_2SO_4$ was diluted to 2500 ml with deionized water and cooled to 10° C;

(B) 655 ml of 41 Be commercial sodium silicate (sp. gr. 1.394, 28.65 wt. % $SiO_2$ and 8.90 wt. % $Na_2O$) was diluted to 2500 ml with deionized water and cooled to 10° C. When equal volumes of (A) and (B) were mixed, the pH was too low for rapid gelation, so 3.0 gm NaOH was dissolved in solution (B).

Solution (B) was poured rapidly into Solution (A); with stirring and after 4½ minutes the mixture set to a vibrant hydrogel. After syneresis overnight, the hydrogel was cut into ½- to 1-inch pieces and placed on a larger Buchner funnel. It was washed free of sodium by soaking in 0.3 N $HNO_3$ for half an hour, followed by draining and repeating of this sequence four times. The product so formed was then washed with water in the same way for a total of five times.

The hydrogel was partially dried and then mulled with enough $NH_4VO_3$ to give 10% by weight of $V_2O_5$ and 90% by weight of $SiO_2$ in the final calcined product. The moisture content of the mulled mixture was adjusted until an extrudable product was formed. It was then extruded, dried, and calcined as in Example VI.

EXAMPLE VIII

An aluminum phosphate hydrogel was prepared substantially as described in Example IV of U.S. Pat. No. 3,147,227. A slight excess of $Al_2O_3$ (5–10%) remained in the preparation in order to preserve a high surface area. This hydrogel was combined with 10% $V_2O_5$ as in Example VII and finished in the same way.

The following Example demonstrates the ability of the catalyst of Example VI to oxidize $H_2S$ to $SO_2$.

EXAMPLE IX

In seven different experimental runs, a feed gas-air mixture (water vapor dew point = 68° F) having the average dry composition shown in Table IV was passed over the catalyst prepared as described in Example VI.

Each run was conducted at a different isothermally held temperature but in all other respects the runs were identical. No recycle or other diluent gases were used. Other pertinent data concerning the runs were as follows: Pressure = 3.5 – 5.3 in. $H_2O$ (above atmospheric); GHSV - 4189; Excess Air Available = 1.5 times stoichiometric (for Reaction (I)).

The results obtained are summarized in columns 1 through 7 of Table IV. It was observed that results with this catalyst with respect to percent $H_2S$ oxidized were similar to those produced by the alumina based catalyst of Example IV. Additionally, this catalyst appeared to perform better at high temperatures inasmuch as less COS was formed, less $H_2$ was oxidized and the oxidation of $H_2S$ to $SO_2$ was almost complete. (However, as will be explained more fully in Example XI, these results are probably not related as much to the performance of the catalyst as they are to the fact that 7 was present in the product gas in this Example and none was available in run 7 of Example IV). Also, this example shows that the presence of $NH_3$ in the feed gas had no noticeable effect upon the performance of the catalyst.

was concluded that the sulfur was present in the catalysts as sulfate. Thus, although the mordenite based catalyst was used to incinerate $H_2S$ for 10 more days of sustained operation than the alumina based catalyst, it was found to be sulfated less than 25% as much.

The following Example illustrates the use of a silica based catalyst in the invention.

EXAMPLE XI

In four experimental runs utilizing a first feed gas-air mixture, and in three other runs utilizing a second feed gas-air mixture (all having a water vapor dew point - 68° F), the respective gas mixtures were passed over the catalyst of Example VII ($SiO_2$ gel base). The feed gases had the dry compositions designated first feed and second feed in Table V. Each run was conducted at a different isothermally held temperature but in all other respects the runs were identical. No recycle or other diluent gases were used. Other pertinent data concerning the runs were as follows: Pressure - 5.4 - 8.0 in. $H_2O$ (above atmospheric); GHSV - 4189; Excess Air Available = 1.5 times the stoichiometric amount (for Reaction (I)) in first feed and 2.0 times the stoichiometric

TABLE IV

| Run No. | 1 | 2 | 3 | 4 | 5 | 6 | 7 |
|---|---|---|---|---|---|---|---|
| Temperature of Run, ° F | 502 | 601 | 701 | 802 | 853 | 883 | 903 |
| Component | Feed | | | | | | | |
| $H_2$, mol % | 16.48 | 16.94 | 16.61 | 15.59 | 16.34 | 15.78 | 15.62 | 15.82 |
| $CH_4$, mol % | 12.03 | 12.19 | 12.39 | 12.58 | 12.34 | 12.50 | 12.77 | 12.56 |
| $N_2$, mol % | 11.46 | 11.73 | 11.73 | 12.05 | 11.81 | 11.67 | 12.06 | 11.65 |
| $O_2$, mol % | 2.79 | 0.99 | 0.55 | 0.09 | 0.41 | 0.41 | 0.35 | 0.14 |
| Ar, mol % | 0.13 | 0.14 | 0.14 | 0.14 | 0.14 | 0.14 | 0.14 | 0.13 |
| $CO_2$, mol % | 55.88 | 56.84 | 57.29 | 58.32 | 57.72 | 58.11 | 57.77 | 58.33 |
| $H_2S$, ppmv | 12059 | 316 | 27 | 108 | 26 | 23 | 16 | 26 |
| $CH_3SH$, ppmv | 13 | 0 | 0 | 0 | 0 | 4 | 0 | 15 |
| COS, ppmv | 15 | 14 | 17 | 30 | 34 | 49 | 27 | 27 |
| $SO_2$, ppmv[2] | 193 | 11306 | 12874 | 12271 | 12307 | 13826 | 12907 | 13594 |
| $CS_2$, ppmv | 6 | 30 | 4 | 7 | 7 | 8 | 6 | 6 |
| $NH_3$, ppmv | 500 | — | — | — | — | — | — | — |
| Total S compounds, ppmv[1,2] | 12292 | 11696 | 12926 | 12423 | 12381 | 13918 | 12962 | 13674 |
| % $H_2S$ Conversion | — | 97.3796 | 99.7761 | 99.1044 | 99.7844 | 99.8093 | 99.8673 | 99.7844 |

[1]Expressed as ppmv $SO_2$ or ppmv monatomic sulfur compounds.
[2]The slight increase of total sulfur compounds is due to analytical errors in determining $SO_2$; $SO_2$ values should be somewhat lower.

The following Example shows how resistant the mordenite based catalysts are to sulfation.

EXAMPLE X

A 10% $V_2O_5$ on alumina catalyst prepared in the manner set forth hereinbefore and a catalyst prepared as described in Example VI were each used to incinerate $H_2S$ in a feed gas — air mixture (water vapor dew point = 68° F) having the nominal feed compositions shown in Tables III and IV, respectively. After the alumina based catalyst had been continuously used for 8 days and the mordenite based catalyst for 18 days under identical operating conditions of: pressure 3.5 - 15 in. $H_2O$ (above atmospheric); GHSV - 4189; excess Air available = 1.5 times stoichiometric (for Reaction (I)); operating temperature range - 300° - 950° F, the catalysts were analyzed for sulfur content by means of an induction furnace analytical technique (ASTM D-1552 modified for determination of sulfur in inorganic solids). The alumina based catalyst was found to contain 2.21% sulfur while the mordenite based catalyst contained only 0.54% sulfur. Since no sulfur could be leached from either catalyst by a carbon disulfide extraction, it amount (for Reaction (I)) in second feed.

The results obtained are summarized in columns 1 through 7 of Table V. It was observed that results with this catalyst with respect to percent $H_2S$ oxidized were similar to those obtained with the alumina based catalyst of Example IV and the mordenite based catalyst of Example IX. In addition, two other facts were apparent:

(1) In comparing columns 4 and 7 of Table V it appears obvious that if oxygen is available in the product gas at temperatures above about 900° F, no $H_2S$ is produced via Reaction (III) nor is any appreciable amount of COS formed. It appears likely that when less than about 2 times the amount of excess air required for Reaction (I) is present at temperatures in excess of 900° F, the oxidation of $H_2$ with $O_2$ takes place to some extent in competition with Reaction (I). Once the oxygen is depleted, conditions evidently become favorable for Reaction (III).

(2) Since 2.0 times stoichiometric air was used to produce the results of column 7 and still no significant loss of hydrogen was detected, it is concluded that no $SO_3$ is produced even under temperature and oxidizing conditions most likely to lead to such a result.

TABLE V

| Run No. | 1 | 2 | 3 | 4 | | 5 | 6 | 7 |
|---|---|---|---|---|---|---|---|---|
| Temperature of Run, °F | 503 | 703 | 883 | 953 | | 703 | 883 | 953 |
| Component | 1st Feed | | | | 2nd Feed | | | |
| $H_2$, mol % | 15.59 | 16.08 | 15.04 | 14.94 | 11.44 | 14.20 | 14.42 | 12.98 | 11.55 |
| $CH_4$, mol % | 12.09 | 12.02 | 12.44 | 12.46 | 13.28 | 10.61 | 10.82 | 10.92 | 11.18 |
| $N_2$, mol % | 11.65 | 11.95 | 11.81 | 12.10 | 12.54 | 18.81 | 19.33 | 19.76 | 20.33 |
| $O_2$, mol % | 2.85 | 1.04 | 0.47 | 0.12 | 0.00 | 4.74 | 2.86 | 2.43 | 1.34 |
| Ar, mol % | 0.13 | 0.13 | 0.14 | 0.60 | 0.15 | 0.22 | 0.22 | 0.23 | 0.24 |
| $CO_2$, mol % | 56.39 | 57.41 | 58.72 | 58.30 | 61.36 | 50.34 | 51.19 | 52.50 | 54.14 |
| $H_2S$, ppmv | 12714 | 431 | 23 | 20 | 9187 | 10558 | 22 | 21 | 23 |
| $CH_3SH$, ppmv | 9 | 2 | 0 | 0 | 8 | 4 | 0 | 0 | 0 |
| COS, ppmv | 12 | 13 | 33 | 61 | 1437 | 17 | 16 | 35 | 31 |
| $SO_2$, ppmv[2] | 173 | 13252 | 13770 | 14641 | 1693 | 238 | 11524 | 11720 | 12144 |
| $CS_2$, ppmv | 4 | 9 | 6 | 5 | 28 | 5 | 7 | 14 | 6 |
| $NH_3$, ppmv | 500 | — | — | — | — | 500 | — | — | — |
| Total S compounds, ppmv[1,2] | 12916 | 13716 | 13838 | 14732 | 12381 | 10827 | 11576 | 11804 | 12210 |
| % $H_2S$ Conversion | — | 96.61 | 99.82 | 99.84 | 27.74 | — | 99.79 | 99.80 | 99.78 |

[1]Expression as ppmv $SO_2$ or ppmv monatomic sulfur compounds.
[2]The slight increase of total sulfur compounds is due to analytical errors in determining $SO_2$; $SO_2$ values should be somewhat lower.

The following Example compares the hydrolytic stability of a mordenite based catalyst and a silica based catalyst.

EXAMPLE XII

A 10% $V_2O_5$-mordenite based catalyst prepared as described in Example VI, and a 10% $V_2O_5$ on silica catalyst prepared as described in Example VIII were steamed at 850° F for 112 hours. Saturated steam was used. The physical characteristics of the catalysts after this severe hydrothermal treatment are shown in Table VI.

TABLE VI

| Physical Characteristics | Vanadia-Mordenite | | Vanadia-Silica | |
|---|---|---|---|---|
| | Fresh | After Steam | Fresh | After Steam |
| Crushing Strengths, pounds per ⅛" | 7.0 | 6.3 | 2.7 | 2.3 |
| Surface Area, m²/gm | 467 | 349 | 554 | 296 |

Figure 2:
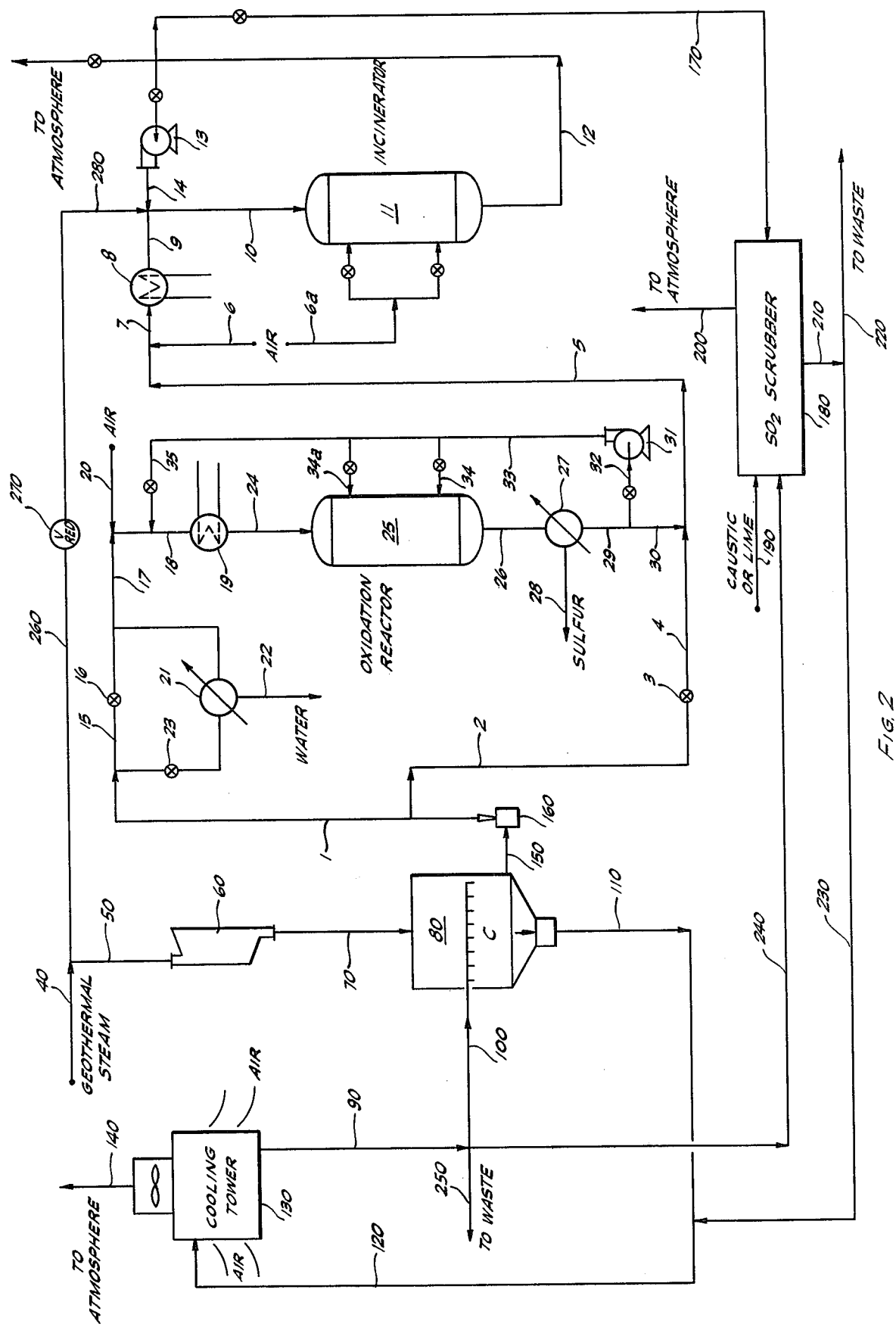
FIG. 2 is a simplified flow diagram illustrating a method for applying the invention to purfication of off-gases from geothermal power plants. Similar apparatus components in FIGS. 1 and 2 are designated by the same reference numeral.

In a specific embodiment of the invention, the $H_2S$ in the vent gases emanating from geothermal power plants is incinerated. As shown in FIG. 2, these power plants send geothermal steam containing usually between about (by weight) 100–500 ppm $H_2S$, 100–800 ppm $CH_4$ and 25–300 ppm $H_2$, through lines 40 and 50 to a turbine 60. The exhausted steam is passed via conduit 70 to a contact condenser 80 wherein it is condensed by intimate intermingling with 40° – 150° F cooling water from lines 90 and 100. The resulting mixture is then routed through lines 110 and 120 to a cooling tower 130, in which the heat absorbed by the cooling water is released to a cross or countercurrently flowing air stream. Off gases (i.e., air plus gases stripped from the cooling water in the cooling tower) are then emitted to the atmosphere via line 140.

Only some of the $H_2S$ in the exhausted steam is soluble in the cooling water; thus, a portion of $H_2S$ is emitted from the cooling tower via line 140 and the remainder is withdrawn from the condenser with the other noncondensable gases. Normally, the $H_2S$ from the condenser is discharged to the atmosphere with the other noncondensable gases by means of a jet ejector. By the process of this invention, however, these gases are sent by jet ejector 160 through lines 150, 1, 2, 4 and 5 to effect ultimate incineration of the $H_2S$ contained in said gases by one of the embodiments hereinbefore described with reference to FIG. 1. Alternatively, prior to incineration, all or a portion of the noncondensable gases can be routed by jet ejector 160 to line 15 to be treated by one of the embodiments hereinbefore described with reference to FIG. 1, in which the oxidation reactor 25 converts to elemental sulfur at least 50%, and preferably 90%, of the $H_2S$ contained in said noncondensable gases. In either case, the purified off gases can then be discharged from the incinerator 11 to the atmosphere via line 12. However, they are preferably conducted via conduit 170 to a conventional $SO_2$ scrubber 180 wherein $SO_2$ is dissolved in an aqueous solvent and the remaining purified gases are discharged to the atmosphere through line 200.

A preferred aqueous medium for absorbing $SO_2$ in $SO_2$ scrubber 180 is a portion of the cooling water from cooling tower 130, which portion may be diverted to scrubber 180 via line 240. If desired, caustic or lime can be added via line 190 to increase the absorbtion of $SO_2$ in scrubber 180. However, since $SO_2$ is quite soluble in aqueous solutions having a pH as low as 3.5, the cooling water, which desirably is maintained in the pH range of about 5.5 – 7.5, is preferably used without adding alkaline chemicals.

Normally, the waste water from the $SO_2$ scrubber 180 is discharged to waste via lines 210 and 220. In the preferred mode of operation, however, at least a portion of this waste water is directed via lines 210, 230 and 120 to cooling tower 130 to maintain the cooling water in the desired pH range of 5.5 – 7.5. It will be understood that geothermal steam normally contains some ammonia, which would build up in the cooling water, raising its pH to above 7.5, thereby creating potential scaling problems, especially if ground waters are used as partial make-up to the cooling water system. Thus, this embodiment of the invention relieves the geothermal power plant of reliance on chemicals for cooling water pH control. Additionally, if the waste water aids in dropping the pH of the cooling water into the lower part of the 5.5 – 7.5 pH range, e.g., 5.5 – 6.0, $H_2S$ absorption by the cooling water in the contact condenser will be reduced. Therefore, more $H_2S$ would be withdrawn as a noncondensable gas via line 150, and less would be discharged from the cooling tower. Finally, at least a portion of the $H_2S$ that is absorbed by the cooling water would form elemental sulfur via the aqueous Claus Reaction (II), thus further reducing $H_2S$ discharges from the cooling tower.

As hereinbefore set forth, externally derived gases can be utilized for temperature control purposes in incinerator 11. FIG. 2 shows the use of geothermal steam as one such externally derived gas being added as a diluent via lines 260 and 280. Although the catalysts of the invention, especially one comprising $V_2O_5$ on alumina, are physically stable even in the presence of saturated steam, it is anticipated that saturated or near-saturated steam might decrease the activity of the catalyst for incinerating $H_2S$. This may be caused either by condensation of water in the catalyst pores or by the displacement of adsorbed $H_2S$ from the catalyst's active sites. In either event, to prevent catalyst deactivation, the stream is preferably flashed through reducing valve 270, or other suitable device, to insure contact of only dry steam with the catalyst.

As a final note to the embodiment illustrated in FIG. 2, it is conceived that such embodiment is also applicable to goethermal power plants utilizing surface condensers, rather than contact condensers as in FIG. 2. In fact, those that employ surface condensers, or can otherwise be modified to have their cooling water systems made independent of their steam cycle, permit recovery of essentially all the $H_2S$ as a noncondensable gas. Thus, all the $H_2S$ emitted by the power plant could be treated by one of the incineration, or sulfur recovery-incineration, embodiments hereinbefore described, and none would be discharged by the cooling tower.

The following Example is illustrative of the performance of the process when utilized to treat noncondensable gases emanating from geothermal power plant condensers.

EXAMPLE XIII

A geothermal power plant must treat the vent gases (water dew point = 72° F) emitted from its contact condenser. A typical dry gas composition of these vent gases is as follows (in mole %): $H_2$– 17.79; $CH_4$ – 13.12; $N_2$ – 6.26; $O_2$ – 2.21; $CO_2$ – 59.23; $H_2S$ – 1.34 and $NH_3$ – 0.05. Except for the lack of trace amounts of Ar, $CH_3SH$, COS, $SO_2$ and $CS_2$ and the presence of more water vapor, this compositon is very similar to the feed gas of Example IX. It can therefore be expected that when these vent gases are incinerated under the conditions specified in that Example, and at the temperatures indicated in Table IV, substantially the same results shown in columns 1 through 7 of Table IV would be obtained.

In another embodiment of the invention, the raw geothermal steam can be processed prior to entering the geothermal power plant turbine by any of the incineration embodiments hereinbefore set forth and shown schematically in FIG. 1. Another application in which $H_2S$ in geothermal steam can be incinerated without firstly separating it from the steam is in the purification of gaseous effluents from "wild" geothermal wells. A "wild" geothermal well is a term used in the art in reference to those geothermal wells which must be continuously bled to minimize the internal pressure. Such bleeding usually discharges to the atmosphere steam containing $H_2S$, $CH_4$ and $H_2$ in concentration ranges hereinbefore described. For this embodiment the use of hydrogen mordenite or alumina as catalyst supports is preferred because of their resistance to deactivation in the presence of water vapor.

The term "non-condensable gases" as employed herein refers to those gases derived from geothermal steam which remain uncondensed at 150° F or less and at atmospheric pressure or less.

It will be apparent to those skilled in the art from the foregoing that numerous modifications of the invention are contemplated. Accordingly, any and all such embodiments are to be construed as coming within the scope of the invention as defined in the appended claims or substantial equivalents thereto.

I claim:

1. A process for oxidizing $H_2S$ to $SO_2$ in a feed gas containing a minor proportion of $H_2S$ and a substantial proportion of $H_2$, which process comprises:
    (1) contacting said feed gas, in admixture with oxygen supplied in excess of the amount required to convert all of said $H_2S$ to $SO_2$, with an oxidation catalyst at a temperature between about 300° and 900° F so as to convert at least some of said $H_2S$ to $SO_2$, said oxidation catalyst comprising a vanadium oxide and/or sulfide as the essential active component supported on a non-alkaline porous refractory oxide, said contacting converting essentially none of said $H_2S$ or $SO_2$ to $SO_3$; and
    (2) recovering a gaseous effluent of reduced $H_2S$ content, but still containing essentially all of said $H_2$.

2. A process as defined in claim 1 wherein said oxygen in step (1) is supplied in the form of air and said hydrogen is present in said feed gas in a concentration of at least 500 ppmv.

3. A process as defined in claim 1 wherein said non-alkaline porous refractory oxide is selected from the class consisting of alumina, silica-alumina, silica-magnesia, zirconia, silica-zirconia, titania, silica-titania, silica-zirconia-titania, and combinations thereof.

4. A process as defined in claim 3 wherein said essential active component comprises between about 1 and 30 weight percent $V_2O_5$.

5. A process as defined in claim 1 wherein said contacting in step (1) is controlled to convert at least about 90% of said $H_2S$ to $SO_2$ and said hydrogen is present in said feed gas in a concentration of at least 500 ppmv.

6. A process as defined in claim 1 wherein said contacting in step (1) is carried out substantially adiabatically, and sufficient of a gaseous diluent is admixed with said feed gas to maintain said gaseous effluent of step (2) at a predetermined maximum temperature.

7. A process as defined in claim 6 wherein said predetermined maximum temperature is between about 500° and 900° F.

8. A process as defined in claim 7 wherein said gaseous diluent is excess air and/or a portion of said gaseous effluent from step (2).

9. A process as defined in claim 1 wherein said feed gas is a sour natural gas, a sour refinery gas or a hydrogenated Claus tail gas.

10. A process as defined in claim 1 wherein said feed gas is the off-gas from a preceding partial oxidation of a relatively $H_2S$-rich gas wherein a substantial portion of $H_2S$ was oxidized to elemental sulfur, followed by separation of said elemental sulfur therefrom.

11. A process as defined in claim 10 wherein said partial oxidation was effected by contacting said $H_2S$-rich gas, in admixture with sufficient oxygen to convert at least about 50% of said $H_2S$ to elemental sulfur, with an oxidation catalyst at a temperature between about 250° and 450° F and at a space velocity correlated with temperature so as to convert at least about 50% of said $H_2S$ to elemental sulfur, said oxidation catalyst comprising a vanadium oxide and/or sulfide supported on a non-alkaline porous refractory oxide.

12. A process as defined in claim 11 wherein said H$_2$S-rich gas is a hydrogenated Claus tail gas, a sour natural gas or a sour refinery gas.

13. A process as defined in claim 1 wherein said feed gas is contacted with said catalyst at a temperature between about 500° and 900° F.

14. A process as defined in claim 1 wherein said feed gas is contacted with said catalyst at a temperature between about 600° and 850° F.

15. A process as defined in claim 2 wherein said catalyst comprises between about 1 and 30 weight percent V$_2$O$_5$.

16. A process as defined in claim 13 wherein said feed gas contains a substantial proportion of CO and said gaseous effluent of step (2) contains essentially all of said CO.

17. A process as defined in claim 13 wherein said feed gas contains a substantial proportion of light hydrocarbons and said gaseous effluent of step (2) contains essentially all of said light hydrocarbons.

* * * * *